Inventor:
John Ernest Wainwright
by Babcock & Babcock
Attorneys

Patented Apr. 8, 1941

2,237,975

UNITED STATES PATENT OFFICE 2,237,975

APPARATUS FOR DRESSING OR FORMING GRINDING WHEELS USED FOR GRINDING OR FINISHING GEAR TEETH

John Ernest Wainwright, Coventry, England, assignor to Coventry Gauge & Tool Company Limited, Coventry, England Application July 11, 1940, Serial No. 344,990
In Great Britain November 10, 1938

6 Claims. (Cl. 125—11)

This invention relates to apparatus for dressing or forming grinding wheels used for grinding or finishing gear teeth and more particularly to apparatus for this purpose of the kind in which the dressing tool has a controlled movement in a plate arranged for oscillation about a fixed centre.

In apparatus of this kind as at present proposed the movement of the dressing tool on and relatively to the plate is controlled by a slide having a link connection with a normally fixed axis the position of which in relation to the axis of oscillation of the plate is manually adjustable to provide for micrometric displacement of the dressing tool.

According to the present invention apparatus of the kind referred to is distinguished from that at present proposed in that the movement of the dressing tool on and relatively to the plate is controlled by means, such as an adjustable sine bar, mounted in said plate and adapted for movement relatively thereto.

The relative motions of the said controlling means and of the plate are derived from a common source and are of such respective extent as to cause the point of the dressing tool to describe either a true involute curve or a modified form thereof according to the adjustment of said means and the setting of the dressing tool.

In the accompanying drawings.

Figure 1:
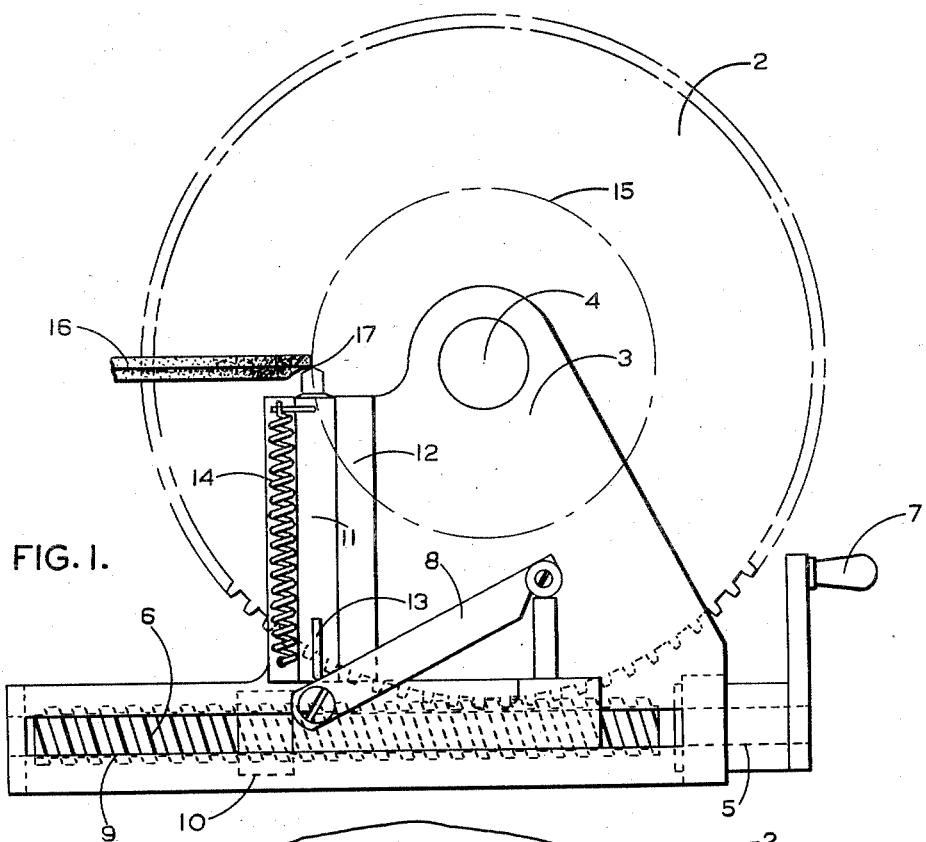
Figure 1 illustrates one form of the improved apparatus with the parts thereof in the positions they assume at the commencement of the dressing operation.
Figure 2:
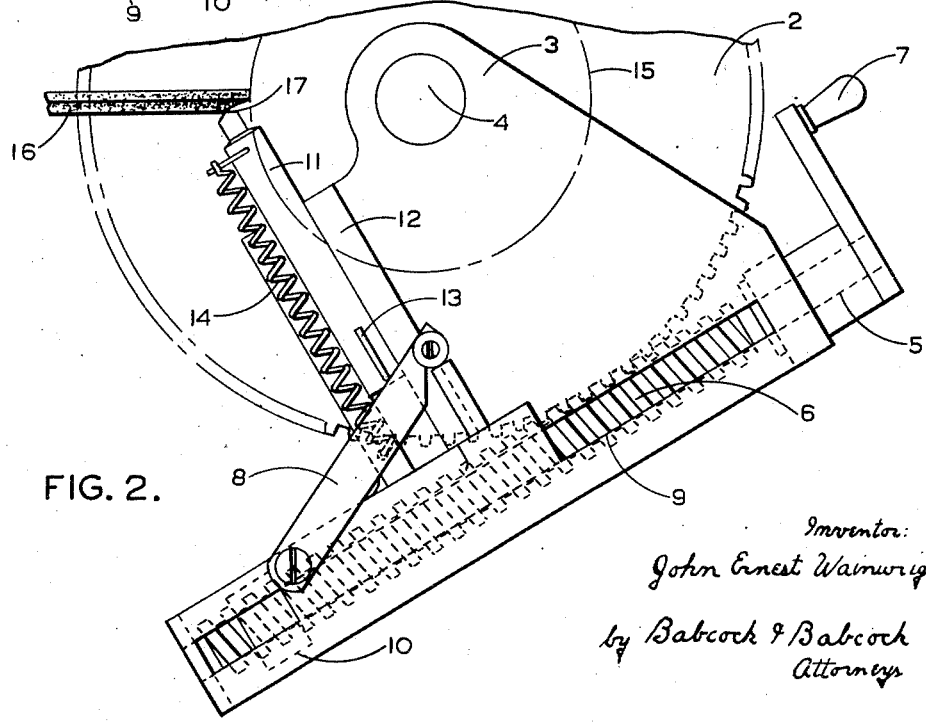
Figure 2 shows the same apparatus at the conclusion of the dressing operation.

Referring to the form shown in Figures 1 and 2, the improved wheel dressing apparatus comprises a stationary gear wheel 2 adapted for attachment to a suitable support, a plate 3 pivotally mounted on an arbor 4 at the geometrical centre of said wheel, a spindle 5 rotatably mounted on said plate and carrying a worm 6 in constant mesh with said gear wheel 2 and having an operating handle 7, a sine bar 8 slidably mounted in a slot 9 in said plate 3 and carrying a sleeve nut 10 engaging said worm, and a dressing tool 11 slidably mounted in a guide 12 in said plate and carrying a stylus 13 co-operating with said sine bar. The stylus is maintained in contact with the sine bar by means of a tension spring 14 attached to the dressing tool at one end and anchored at the other end to the plate 3.

The operation of the apparatus is such that when the plate 3 is swung in one direction about its pivotal point at the centre of the gear member 2 by rotating the spindle 5 in the appropriate direction, the co-action between the worm 6 on said spindle and the sleeve nut 10 on the sine bar 8 causes the latter to move relatively to the plate in the reverse direction. The resulting co-action between the sine bar and the stylus 13 on the dressing tool 11 then causes the latter to move relatively to said plate in a direction tangential to a circle 15 concentric with the pivotal point 4 of said plate. The combined effect of the simultaneous motions of the plate 3 and of the sine bar is to cause the point 17 of the dressing tool to form the operative surface of the grinding wheel 16 to the required curve. If a true involute curve is required the point 17 of the dressing tool at the commencement of the dressing operation must, as shown in Figure 1, lie on the circle 15 which, in this case, would be the base circle of the involute, and the sine bar must be adjusted to such an angle that the extent of the movement of the dressing tool relatively to the plate 3 is equal to the linear equivalent of the arc about which the tool moves tangentially to the base circle. Any desired modified form of involute can be obtained by appropriate adjustment of the angle of the sine bar and by the setting of the dressing tool with respect to the base circle. The worm 6 on the spindle 5 may be made in two parts and of different pitches. This would enable the gear ratios between one worm and the nut 10 and between the other worm and the gear wheel 2 to be varied at will. In this way the relative motions of the sine bar and plate 3 can be varied as desired according to the nature of the curve required.

Figure 3:
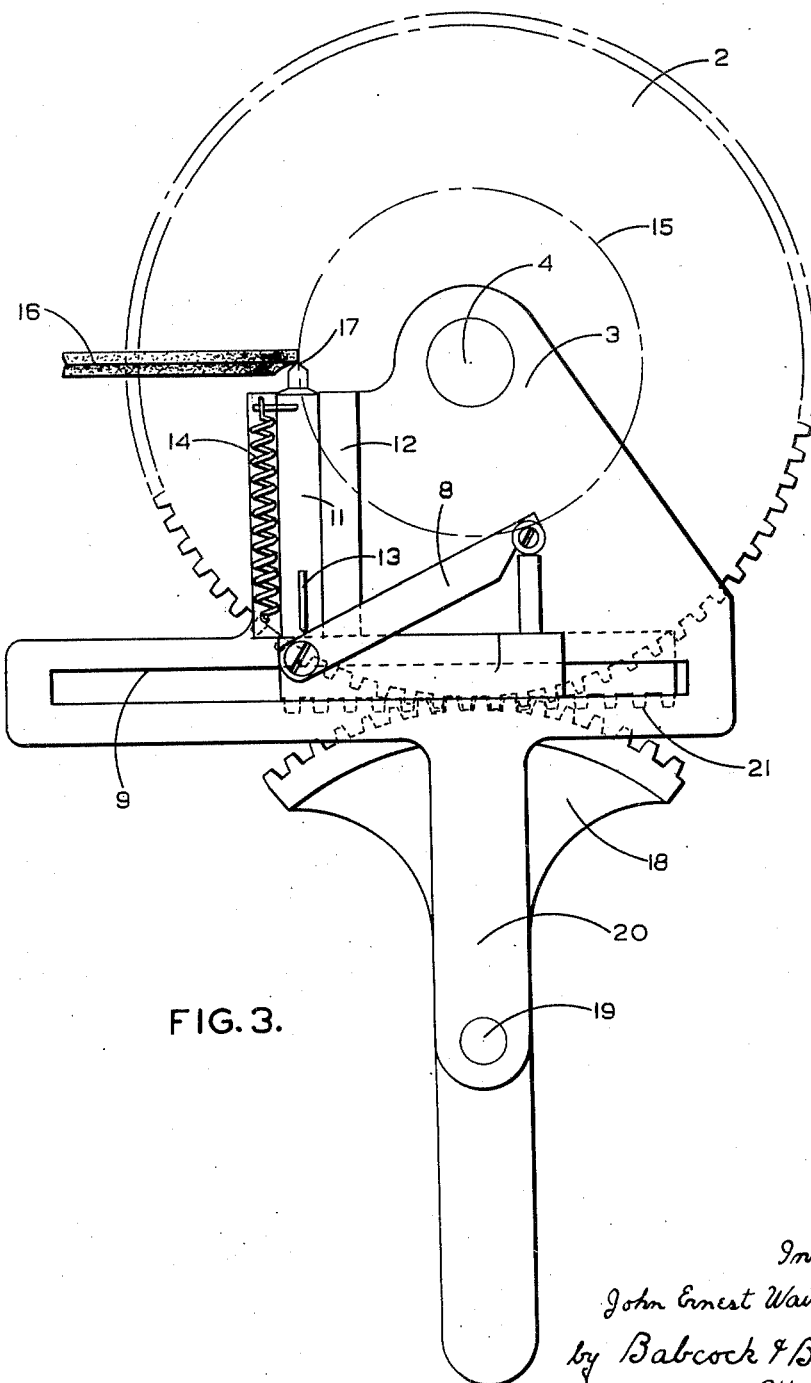
Figure 3 represents a modified form of dressing apparatus embodying the present invention.

In a modified form of the improved apparatus the simultaneous movements of the plate 3 and of the sine bar 8 in opposite directions can be produced, as shown in Figure 3, by means of a toothed quadrant 18 pivoted at 19 in an extension 20 of the plate 3 and meshing with the stationary gear wheel 2 and with a rack 21 on the sine bar 8.

It is to be understood that the improved apparatus in either of its forms can be adapted for use in relation to base circles of different diameters.

For the purpose of reducing interference between gears ground by means of a grinding wheel dressed in accordance with the present invention, a suitably modified form of curve for the teeth may be produced by providing a sine bar having a composite surface for co-action with the stylus. By way of example, the operative surface of the sine bar can be divided into two portions which are at an angle one with the other, and the point of intersection of the said surfaces would occur at the position reached by the stylus when it is calculated the interference begins. The composite surface of the sine bar may have any suitable number of faces according to the required modification of the curve.

The above described apparatus in either of its forms may be duplicated and worked from a common centre so that both sides of the grinding wheel may be dressed simultaneously, or a single apparatus may be arranged for rotation through 180° so as to operate on either side of the wheel.

I claim:

1. Apparatus of the character and for the purposes described comprising a stationary gear member, a plate adapted for oscillation about the centre thereof, an operating spindle carried by said plate and having a worm in constant mesh with said stationary gear member, a dressing tool slidably mounted in said plate, and means operated by said worm for imparting a predetermined rectilinear motion to said dressing tool simultaneously with the oscillatory motion of said plate.

2. Apparatus of the character and for the purposes described comprising a stationary gear member, a plate adapted for oscillation about the centre thereof, means for oscillating said plate, a dressing tool slidably mounted in said plate, a sine bar carried by said plate, a stylus carried by said dressing tool and co-operating with said sine bar, and means operated by said plate oscillating means for moving said sine bar relatively to said stylus to give a predetermined rectilinear movement to said dressing tool simultaneously with the oscillatory movement of said plate.

3. Apparatus of the character and for the purposes described comprising a stationary gear member, a plate adapted for oscillation about the centre thereof, an operating spindle carried by said plate and having a worm in constant mesh with said stationary gear member, a dressing tool slidably mounted in said plate, a non-rotatable nut sliding in said plate and engaging said worm, a sine bar carried by said nut, a stylus carried by said dressing tool and co-operating with said sine bar, and a handle for rotating said spindle.

4. Apparatus of the character and for the purposes described comprising a stationary gear member, a plate adapted for oscillation about the centre thereof, a dressing tool slidably mounted in said plate, means for operating said dressing tool, and a toothed quadrant pivotally mounted in said plate in constant mesh with said gear member and in operative engagement with said dressing tool operating means.

5. Apparatus of the character and for the purposes described comprising a stationary gear member, a plate adapted for oscillation about the centre thereof, a dressing tool slidably mounted in said plate, a sine bar slidably mounted in said plate in operative engagement with said dressing tool and having rack teeth, a toothed quadrant pivotally mounted in said plate in constant mesh with said gear member and with the rack teeth of said sine bar and a handle for rocking said quadrant about its pivot in said plate.

6. Apparatus of the character and for the purposes described comprising a stationary gear member, a plate mounted for oscillation about the center thereof, a dressing tool mounted on said plate for rectilinear movement relative thereto, actuating means carried by said plate in mesh with said gear member to cause oscillation of said plate, and means carried by said plate in mesh with said actuating means and operatively connected to said dressing tool to cause rectilinear movement of said tool during oscillation of said plate.

JOHN ERNEST WAINWRIGHT.